Dec. 19, 1967  L. J. NEVETT  3,359,384
DIRECTIONAL TURN SIGNAL SWITCH WITH CAMS INCLINED
TO THE PLANE OF ROTATION OF THE STRIKER
Filed March 25, 1966  2 Sheets-Sheet 2
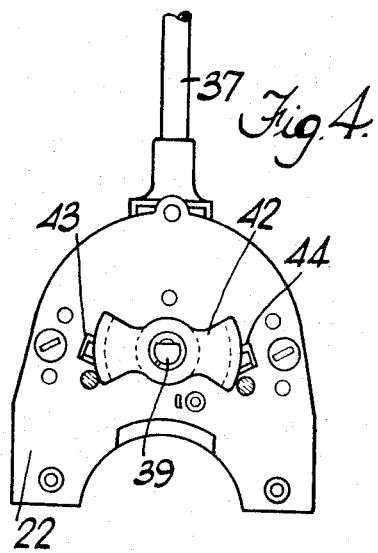
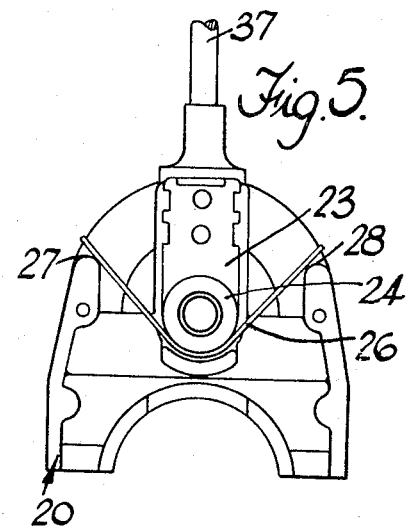
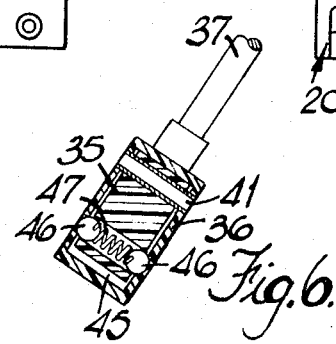
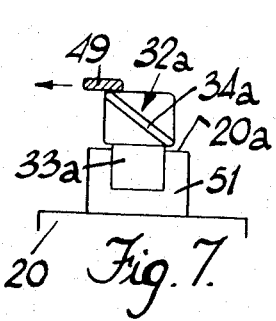
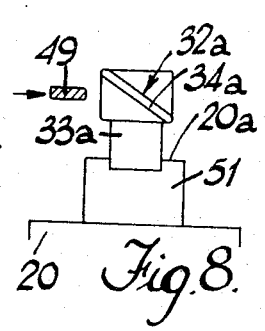
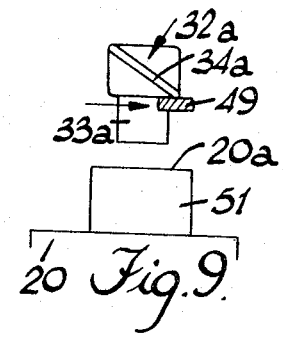

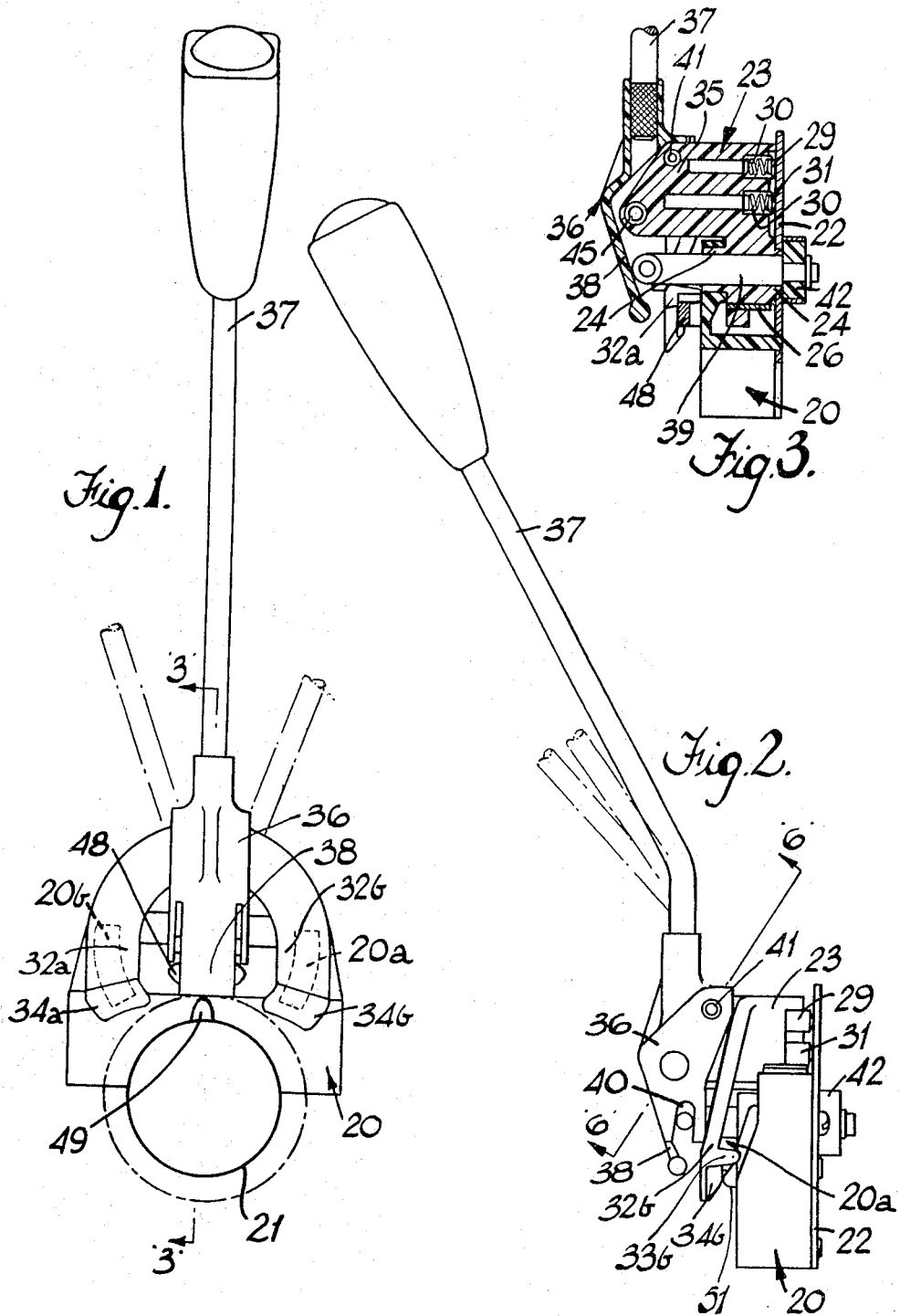

United States Patent Office 3,359,384
Patented Dec. 19, 1967

3,359,384
DIRECTIONAL TURN SIGNAL SWITCH WITH CAMS INCLINED TO THE PLANE OF ROTATION OF THE STRIKER
Leslie James Nevett, Whalley, England, assignor to Joseph Lucas (Industries) Limited, Birmingham, England
Filed Mar. 25, 1966, Ser. No. 537,422
Claims priority, application Great Britain, Mar. 26, 1965, 12,876/65
4 Claims. (Cl. 200—61.34)

ABSTRACT OF THE DISCLOSURE

A direction indicator switch for use in a road vehicle includes an actuating member movable from an inoperative position to a pair of operative positions in which it completes circuits to direction indicator lamps on opposite sides of the road vehicle. In the operative positions, one of a pair of cams carried by the actuating member moves into the path of a striker rotatable with the steering wheel of the vehicle. The cams are inclined to the plane of rotation of the striker, and when the turn is being negotiated the striker contacts one surface of a cam and moves the cam in one direction, this movement having no effect on the switch. On return movement of the striker, another surface of the cam is contacted, to move the cam in the opposite direction and so release latch means associated with the actuating member, whereby the actuating member is returned to its inoperative position under the action of resilient means.

---

This invention relates to direction indicator switches which in use are cancelled by a striker rotatable with the steering wheel of a road vehicle.

A direction indicator switch according to the invention comprises in combination a support, an actuating member pivotally connected to said support for angular movement in opposite directions from an inoperative position to a pair of operative positions in which the use the switch completes circuits to direction indicator lamps on opposite sides of the vehicle respectively, resilient means urging the actuating member to its inoperative position, latch means serving to retain the actuating member in its operative positions against the action of the resilient means, and a pair of cams which when the actuating member is moved to its operative positions are moved into the path of movement of said striker respectively, the shape of the cams being such that when a turn indicated by the switch is negotiated the striker will move the appropriate cam towards the support, but after the turn has been negotiated the striker moves in the opposite direction and moves the cam away from the support, movement of the cam away from the support serving to release the latch means so that the resilient means returns the switch to the inoperative position.

An example of the invention are illustrated in the accompanying drawings wherein:

FIGURE 1 is a plan view of a combined vehicle headlamp and direction indicator control switch, FIGURE 2 is a side view of the switch shown in FIGURE 1, FIGURE 3 is a sectional view on the line 3—3 in FIGURE 1, FIGURE 4 is an inverted plan view of the switch shown in FIGURE 1, FIGURE 5 is a view similar to FIGURE 4 with the contact board of the switch removed, FIGURE 6 is a sectional view on the line 6—6 in FIGURE 2, and FIGURES 7, 8 and 9 illustrate the action of the striker and cam portions of the switch.

Referring firstly to FIGURES 1 to 6 there is provided a moulded, synthetic resin support 20 which in use is secured to the outer stationary tube of a motor vehicle steering column indicated by the numeral 21. The support 20 carries a contact board 22. There is further provided a moulded synthetic resin actuating member 23 which is pivotally mounted between the support 20 and the board 22 through the intermediary of a pair of co-axial cylindrical posts 24 integral with the member 23, the posts 24 extending through holes in the support 20 and board 22, and the arrangement being such that the axis about which the member 23 pivots is parallel to the axis of the steering column.

A V-shaped spring 26 is secured at its apex to the member 23 in such a position that the arms of the spring extend beyond the pivotal axis of the member 23 and engage lugs 27, 28 formed on the support 20, so that the springs 26 resists relative rotation between the member 23 and the support 20 in either angular direction, and urges the actuating member to its inoperative position shown. A pair of bridging contacts 29, 31, supported by the member 23 are urged into engagement with the board 22 by springs 30, and in the inoperative position shown engage respectively a pair of contacts printed on the board and connected in use to the vehicle battery. When the actuating member 23 is moved in one angular direction one of the bridging contacts completes a circuit by way of a flasher to the direction indicator lamps on one side of the vehicle, whilst the other bridging contact operates a warning lamp. Movement of the member 23 in the other angular direction operates the indicator lamps on the other side of the vehicle and also operates a second warning lamp.

Integrally formed with the member 23 are a pair of resilient arms 32a, 32b which when the actuating member 23 is moved in opposite angular directions are moved into the path of a striker 49 rotatable with the steering wheel of the vehicle. The arms 32a, 32b incorporate latch portions 33a, 33b extending in planes parallel to the steering axis, and cam portions 34a, 34b which extend towards the steering shaft. The latch portions 33a, 33b slide on ramps 20, 20b integral with the support 20.

In order to energise the lefthand direction indicator circuit of the vehicle the member 23 is pivoted in a counter clockwise direction (FIGURE 1) about the posts 24, which causes the latch portion 33a to ride up the ramp 20a until it reaches the end of the ramp, at which point the resilience of the arm 32a causes the latch portion 33a to engage a shoulder 51a at the end of the ramp 20a. The engagement of the portion 33a with the shoulder 51a maintains the switch in the operative position against the action of the spring 26. When the switch is so positioned the cam portion 34a lies in the path of the striker 49.

When the vehicle negotiates the indicated left turn, the steering wheel is rotated in a counter clockwise direction, which causes the striker 49 to engage the cam portion 34a (FIGURE 7) thereby urging the portion 33a towards the support 20. On completion of the left turn the steering wheel is rotated in a clockwise direction, and as shown in FIGURES 8 and 9 the striker 49 engages the cam portion 34a and moves the portion 33a away from the support 20 clear of the shoulder 51a, thereby allowing the switch to be returned, by the action of the spring 26, to its inoperative position.

The sequence of operations involved when the vehicle is making a right turn are similar, the arm 32b being moved into the path of movement of the striker 49 in this case. The return action of the spring 26 is supplemented by the coaction of the portions 33a, 33b of the arms 32a, 32b with the ramps 20a, 20b.

The actuating member 23 can be moved angularly by an operating lever 37 which is connected to a synthetic resin lever member 36 which is pivotally connected to the member 23 about an axis 41 parallel to the member 20. Extending through the housing 23 coaxially with the posts 24 is a bore in which is slidably received a plunger 39. One end of the plunger 39 is pivotally engaged in slots 40 formed in the member 36, the other end of the plunger 39 carrying a cam plate 42. The cam plate 42 engages spring contacts 43, 44 on the board 22 which are included in the main beam and dipped beam circuits, respectively, of the vehicle head lamps. Pivotal movement of the member 36 about the axis 41 controls the main and dipped beam circuits of the vehicle headlamps. In the member 23 is a bore 45 in which are located a pair of balls 46. The balls 46 are urged apart, into engagement with the parallel surfaces of the member 36 by a spring 47 (FIGURE 6). Two pairs of holes (not shown) are provided in the parallel surfaces of the member 36 and are so arranged that they are engaged by the balls 46 when the main beam and dipped beam circuits respectively of the vehicle headlamps are energised.

The engagement between the balls 46 and the holes in the member 36 serves to maintain the switch in a position to energise either the main or dipped beam circuits.

If the member 36 is moved from the position shown in FIGURE 3 in which the main beam circuit is energised to the position in which the dipped beam circuit is energised, and then further in a counterclockwise direction, the main beam circuit is re-energised. In this position a resilient finger 38 engages an arcuate projection 48, flexure of the finger 38 urging the switch to the dipped beam position so that on release of the lever 37, the member 36 is returned to the dipped beam position.

By virtue of the fact that the striker moves the cam portions towards and away from the support, the striker need not be accurately concentric with respect to the theoretically correct steering column axis for which the switch is designed, because there is a permissible inaccuracy equal to the widths of the cam portions.

Having thus described my invention what I claim as new and desire to secure by Letters Patent is:

1. A direction indicator switch which in use is cancelled by a striker rotatable with the steering wheel of a road vehicle, comprising in combination a support, an actuating member, means pivotally connecting said actuating member to said support for angular movement in opposite directions from an inoperative position to a pair of operative positions in which in use the switch completes circuits to direction indicator lamps on opposite sides of the vehicle respectively, resilient means actuating between the support and actuating member and urging the actuating member to its inoperative position, cooperating latch means on said actuating member and support said latch means serving when the actuating member is moved to an operative position to retain said actuating member in said operative position against the action of the resilient means, a pair of cams carried by said actuating member and which when the actuating member is moved to its operative positions are moved into the path of movement of said striker respectively, each of said cams being movable towards and away from said support and being inclined to the plane of rotation of said striker and defining a first surface which when a turn indicated by the switch is negotiated is engaged by the striker to move the appropriate cam towards the support, and a second surface which is engaged by the striker on return movement thereof after a turn has been negotiated to move the cam away from the support, and means responsive to movement of a cam away from the support for releasing the latch means so that the resilient means returns the switch to the inoperative position.

2. A direction indicator switch which in use is cancelled by a striker rotatable with the steering wheel of a road vehicle, comprising in combination a support, a moulded actuating member, means pivotally connecting said actuating member to said support for angular movement in opposite directions from an inoperative position to a pair of operative positions in which in use the switch completes circuits to direction indicator lamps on opposite sides of the vehicle respectively, resilient means acting between the support and actuating member and urging the actuating member to its inoperative position, a pair of resilient arms formed integrally with said actuating member, the resilience of said arms permitting movement of said arms towards and away from said support, latch means comprising latch portions formed integrally with arms and co-operating portions on said support, said latch means serving when the actuating member is moved to an operative position to retain said actuating member in said operative position against the action of the resilient means, and a pair of cams formed integrally with said arms respectively and which when the actuating member is moved to its operative positions are moved into the path of movement of said striker respectively, each of said cams being inclined to the plane of rotation of said striker and defining a first surface which when a turn indicated by the switch is negotiated is engaged by the striker to move the appropriate cam and its respective arm towards the support, and a second surface which is engaged by the striker on return movement thereof after a turn has been negotiated to move the cam and its associated arm away from the support, movement of an arm away from the support releasing said latch means whereby said resilient means returns the switch to its inoperative position.

3. A switch as claimed in claim 2 in which the latch portions extend towards the support and engage ramps on the support, movement of the switch to an operative position causing a latch portion to move along a ramp as permitted by flexure of the appropriate arm until the latch portion reaches the end of the arm, at which point the resilience of the arm causes the latch portion to engage behind the ramp until the appropriate cam is moved by the striker away from the support so as to release the latch portion.

4. A switch as claimed in claim 3 in which the support is a synthetic resin moulding and the ramps are moulded integrally with the support.

References Cited

UNITED STATES PATENTS

| 2,800,542 | 7/1957 | Barcus et al. | 200—61.34 |
| 3,221,119 | 11/1965 | Weathers et al. | 200—61.27 |
| 3,239,619 | 3/1966 | Brown et al. | 200—61.34 |

FOREIGN PATENTS

| 1,293,979 | 7/1961 | France. |

BERNARD A. GILHEANY, *Primary Examiner.*

H. A. LEWITTER, *Assistant Examiner.*